United States Patent
Mori

US007512317B2

(10) Patent No.: US 7,512,317 B2
(45) Date of Patent: Mar. 31, 2009

(54) SYSTEM, APPARATUS, AND METHOD FOR RECORDING IMAGES IN A MOUNTABLE RECORDING MEDIUM ENABLED BY EXECUTING PROGRAM RESERVATIONS VIA THE SAME

(75) Inventor: Masanori Mori, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 684 days.

(21) Appl. No.: 11/019,571

(22) Filed: Dec. 23, 2004

(65) Prior Publication Data

US 2005/0141872 A1    Jun. 30, 2005

(30) Foreign Application Priority Data

Dec. 25, 2003    (JP)    ............... 2003-431348

(51) Int. Cl.
*H04N 5/907* (2006.01)
(52) U.S. Cl. .................... 386/83; 386/E5.067
(58) Field of Classification Search ............ 386/83, 386/46, E5.067, 124; 348/906; 725/58, 88
See application file for complete search history.

(56) References Cited

U.S. PATENT DOCUMENTS

2002/0028063 A1 * 3/2002 Haneda et al. ................. 386/83

FOREIGN PATENT DOCUMENTS

| JP | 2003-179837 | | 6/2003 |
| JP | 2003-189213 | * | 7/2003 |

OTHER PUBLICATIONS

Suzuki, Machine Generated Translation of JP 2003-189213, Jul. 2003.*

* cited by examiner

*Primary Examiner*—David E Harvey
(74) *Attorney, Agent, or Firm*—Pillsbury Winthrop Shaw Pittman, LLP

(57) ABSTRACT

Program reservation information is input to a recording-medium image recording apparatus, and a recording medium is selected. In the event that automatic updating (overwriting) of the recording medium is set in a state wherein automatic recording to the recording medium has been set, simply inserting the recording medium in that state into the device starts a reservation image recording mode, whereby program reservation is executed, and the recording medium is overwritten by image recording from the top at all times regardless of the contents of the recording medium.

8 Claims, 6 Drawing Sheets

REMOVE CARD FROM 10A AND INSERT IN 10B

SYSTEM, APPARATUS, AND METHOD FOR RECORDING IMAGES IN A MOUNTABLE RECORDING MEDIUM ENABLED BY EXECUTING PROGRAM RESERVATIONS VIA THE SAME

CROSS-REFERENCE TO RELATED APPLICATIONS

This application is based upon and claims the benefit of priority from the prior Japanese Patent Application No. 2003-431348 filed on Dec. 25, 2003; the entire contents of which are incorporated herein by reference.

BACKGROUND OF THE INVENTION

1. Field of the Invention

The present invention relates to a recording-medium image recording system, a recording-medium image recording apparatus, and a recording-medium image recording method, having image recording functions wherein inserting a small-sized recording medium (memory card, small-sized hard disk, etc.) into a main unit device of a television receiver (hereafter referred to as "TV receiver") or a recording/playback device or the like places the device in a recording mode and picture and audio data is recorded in the recording medium.

2. Description of the Related Art

With conventional recording/playback devices such as VCR devices, the playback mode has been basically the primary function, exemplified by the commonplace arrangement wherein inserting a tape cassette into the VCR main unit automatically places the device in a playback mode.

As for recording, users who are not able to be physically present at the device to record a certain programs or the like use timer reservations or the like to program the device to automatically record the desired contents. There are methods for simplifying the timer recording procedures, by controlling recording images and audio from a receiver having program guide functions. In either case, the reservation is independently made with the receiver itself, and executed by the same receiver.

On the other hand, a reservation system has also be proposed wherein reserved program information is recorded in a small recording medium such as a memory card using a reservation recording device, and executed by inserting the small recording medium in a reservation executing device such as a TV receiver or a recording/playback device (e.g., Japanese Unexamined Patent Application Publication No. 2003-179837).

However, conventional arrangements have given priority to the playback part of the recording/playback functions, and there have hardly been any recording/playback devices which enter the recording mode simply by inserting a memory card. Further, there have been no systems which overwrite contents daily on the same memory card such as a particular news program which is broadcasted daily, for example.

Also, the arrangement disclosed in Japanese Unexamined Patent Application Publication No. 2003-179837 involves reservation program information being recorded in a small recording medium such as a memory card or the like using a reservation recording device, and inserting this small recording medium into a reservation executing device such as a TV receiver or a recording/playback device to execute reservations, requiring the task of recording reservation information in the small recording medium beforehand. Also, image recording restrictions and image recording reservation restrictions, such as recording a manufacturer ID (or device ID) in the small recording medium beforehand so as to enable use only with a TV receiver or a recording/playback device having the same manufacturer or device ID, could not be realized with the conventional art. Further, a small recording medium such as a memory card or the like could not be overwritten by image recording.

SUMMARY OF THE INVENTION

Accordingly, it is an object of the present invention to provide a recording-medium image recording system, a recording-medium image recording apparatus, and a recording-medium image recording method, wherein program recording can be executed with a device to which a recording medium can be mounted, simply by mounting the recording medium thereto.

According to a first aspect of the present invention, a recording-medium image recording system comprises:

a program reservation information recording device comprising a setting section for setting program reservation and overwrite-image-recording-permissible information, a first mounting section for mounting a recording medium, a selecting section for selecting whether to record the program reservation and overwrite-image-recording-permissible information in the recording medium, in a state wherein the recording medium has been mounted to the first mounting section, a first recording section for recording the program reservation and overwrite-image-recording-permissible information set by the setting section in the recording medium, in the event that recording to the recording medium has been selected by the selecting section; and said program reservation information execution device comprising a receiving section for receiving television broadcast signals, a demodulating section for demodulating received television broadcast signals, a second mounting section whereby the recording medium is mounted, and a second recording section for executing the program reservation and overwrite-image-recording-permissible information recorded in the recording medium to record the demodulated broadcast signals by overwriting from the top in the recording medium regardless of the contents of the recording medium, in a state wherein the recording medium has been mounted to the second mounting section.

This recording-medium image recording systems according to the present invention have a program reservation information recording device and a program reservation information execution device configured separately, and are image record systems to be used in cases wherein a recording medium, in which program reservation information and overwrite-image-recording-permissible information is recorded by the program reservation information recording device, executes program reservation and overwrite-image-recording at the separately-configured program reservation information execution device.

According to a second aspect of the present invention, a recording-medium image recording apparatus comprises:

a receiving section for receiving television broadcast signals; a demodulating section for demodulating the received television broadcast signals; a first setting section for setting program reservation information; a selecting section for selecting a recording medium for recording a program; a second setting section whereby automatic image recording is set upon a recording medium being selected by the selecting section; a third setting section for setting automatic updating of the recording medium, in the state that automatic image recording to a recording medium has been set by the second setting section; a mounting section whereby the recording medium is mounted; and a recording section for executing the program reservation information set by the first setting section to record the demodulated broadcast signals by overwriting from the top in the recording medium regardless of the contents of the recording medium, in a state wherein the recording medium has been to the mounting section.

This aspect is a configuration used in a case wherein a blank recording medium is inserted into a device main unit on which settings have been made beforehand for program reservation, automatic image recording, and automating updating (that overwriting is permissible), so as to record images in the recording medium.

According to a third aspect of the present invention, a recording-medium image recording method comprises:

a program reservation information recording procedure comprising a setting step for setting program reservation and overwrite-image-recording-permissible information, a first mounting step for mounting a recording medium to a first mounting section, a selecting step for selecting whether to record the program reservation and overwrite-image-recording-permissible information in the recording medium, in a state wherein the recording medium has been mounted to the first mounting section in the first mounting step, a first recording step for recording the program reservation and overwrite-image-recording-permissible information set by the setting step in the recording medium, in the event that recording to the recording medium has been selected in the selecting step; and a program reservation information execution procedure comprising a receiving step for receiving television broadcast signals, a demodulating step for demodulating received television broadcast signals, a second mounting step whereby the recording medium is mounted to a second mounting section, and a second recording step for executing the program reservation and overwrite-image-recording-permissible information recorded in the recording medium to record the demodulated broadcast signals by overwriting from the top in the recording medium regardless of the contents of the recording medium, in a state wherein the recording medium has been mounted to the second mounting section in the second mounting step.

This recording-medium image recording methods according to the present invention executes steps of a program reservation information recording procedure and a program reservation information execution procedure respectively, wherein the program reservation information and overwrite-image-recording-permissible information in the recording medium reserved during the program reservation information recording procedure is executed in the subsequent step of the program reservation information recording procedure.

BRIEF DESCRIPTION OF THE DRAWINGS

FIGS. 2A and 2B are perspective views of examples of reservation image recording to a memory card with the recording-medium image recording apparatus shown in FIG. 1 and using the image recording data, wherein FIG. 2A is a perspective view of the image recording device, and FIG. 2B is a perspective view of a playback device;

FIGS. 5A and 5B are block diagrams illustrating the schematic configuration of a recording-medium image recording apparatus according to a second embodiment of the present invention, wherein FIG. 5A illustrates a recording-medium image recording apparatus functioning as a program reservation information recording deice, and FIG. 5B illustrates a recording-medium image recording apparatus functioning as a program reservation information executing device;

DESCRIPTION OF THE PREFERRED EMBODIMENTS

Preferred embodiments of the present invention will now be described with reference to the drawings.

First Embodiment

Figure 1:
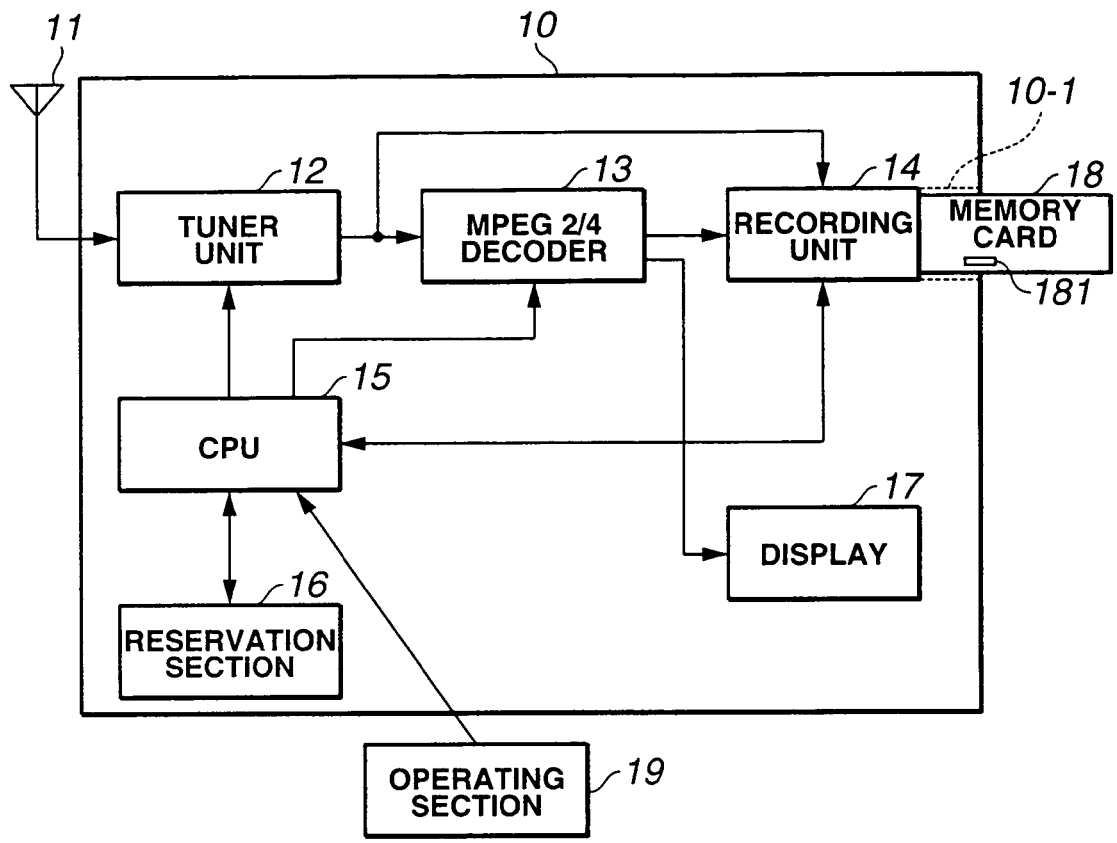
FIG. 1 is a block diagram illustrating the schematic configuration of a recording-medium image recording apparatus according to a first embodiment of the present invention.

FIG. 1 is a block diagram illustrating the schematic configuration of a recording-medium image recording apparatus according to a first embodiment of the present invention. The image recording device according to the present embodiment comprises digital receiving functions.

With reference to the recording-medium image recording apparatus 10 in FIG. 1, digital television broadcast signals are supplied to a digital television broadcast receiving antenna 11, and the broadcast signals are received with a tuner unit 12 serving as a reception section. The received compressed data is decoded (expanded) with an MPEG 2/4 decoder 13 serving as a demodulating section, and either recorded in a large-capacity i.e., main recording medium (not shown) within a recording unit 14 serving as a recording section, or a memory card 18 serving as a small-sized recording medium to be mounted to the recording unit 14. Alternatively, an arrangement may be made wherein un-decompressed data from the tuner unit 12 is recorded to the recording medium or the memory card 18 at the recording unit 14 without being decoded at the MPEG 2/4 decoder 13. Note that the term "MPEG 2/4 decoder" means a MPEG decoder having functions for decoding MPEG2 or MPEG4 compressed data.

The recording-medium image recording apparatus 10 also comprises a CPU 15 serving as control means for controlling recording/playback and data confirmation for the circuits within the device main unit, a display 17 for displaying picture data decoded by the MPEG 2/4 decoder 13, reservation means 16 serving as a setting section for inputting and setting program reservation information and the like, a clock section (not shown), an operating section 19 and so forth.

The recording unit 14 has a mounting section 10-1 provided to the device main unit whereby the memory card 18 can be detachably mounted.

The MPEG 2/4 decoder 13 is capable of decoding both picture and audio data compressed with MPEG2, and picture and audio data compressed with MPEG4. MPEG4 is a standard like H.264 whereby data is sent with data amount of ¹⁄₁₀ or less as compared to MPEG2, and is a standard being studied for receiving and recording ground wave digital broadcasts with mobile equipment in the future.

The recording unit 14 can record both data decoded (expanded) with the MPEG 2/4 decoder 13, or data with MPEG compression from the tuner unit 12, as described above.

With the recording-medium image recording apparatus 10 configured thus, performing reservation settings by setting program reservation information (reception channel, starting time, ending time, etc.) with reservation means 16 beforehand, and inserting the memory card 18 in the mounting means of the device main unit in this state, starts recording of the reserved program under control of the CPU 15 at the image recording start time, and image recording to the memory card 18 is performed by the recording unit 14. The memory card 18 stores a manufacturer ID or model ID serving as an image recording key 181, and prior to starting the image recording operation, the CPU 15 determines whether the image recording key 181 matches the ID held by the recording-medium image recording apparatus 10, and image recording is executed (started) only in the event that these match. Of course, an arrangement might be made wherein image recording can be performed even without an image recording key 181.

An example of reserved image recording to the memory card 18 with such a recording-medium image recording apparatus 10, and use of the image recording data, will be described with reference to FIGS. 2A and 2B.

Figure 2A:
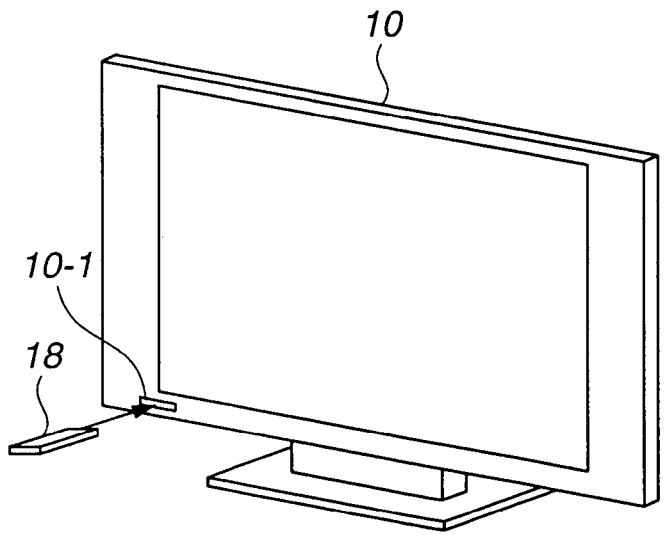
Figure 2B:
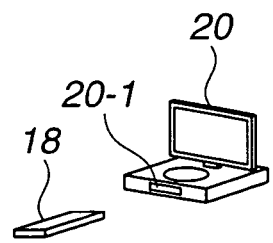

The memory card 18 is mounted to the mounting section 10-1 of the image recording device 10 such as shown in FIG. 2A for example, and following recording of picture (and audio) data, the memory card 18 can be removed from the device main unit and inserted to the mounting portion 20-1 of a viewer 20 such as shown in FIG. 2B to be looked. A viewer 20 normally has no tuner unit, and is economically advantageous to be used as a picture data playback device.

Next, an example of the operations and actions for reservation image recording will be described with reference to the flowchart in FIG. 3.

In order to mount the memory card 18 and perform program reservation image recording, first, program reservation information such as reception channel, starting time, ending time, etc, need to be input using the operating section 19 such as a remote controller. The input program reservation information is set in reservation means 16 (step S1). Note that input of the program reservation information is performed following a menu screen display which is displayed on the display 17, for example. The flow then proceeds to selection of the recording medium.

First, selection is made regarding whether or not to record to the memory card (step S2). In the event that the reservation image recording determination made in step S2 is NO, the flow proceeds to making settings for reservation image recording to the main recording medium within the recording unit 14. Or, the flow proceeds to program viewing reservation to make reservation for viewing a program with the TV receiver functions (step S4).

In the event that a selection is made to record to the memory card in step S2, selection is made regarding whether or not to make automatic image recording settings (step S3). That is to say, in the event that NO is selected in step S3, the normal recording medium reservation method is set, or in other words, the recording mode never starts unless the timer recording button is pressed (step S5).

In the event that a selection is made in step S3 to set automatic image recording, first, the memory card is mounted to the device main unit (step S6), following which determination is made regarding whether or not the memory card has been mounted to the mounting section 10-1 of the device main unit (Step S7). In the event that determination is made that the memory card has been mounted, determination is made regarding whether or not the recording key matches (step S8), and in the event that the recording key matches, determination is made regarding whether or not there is a region available on the memory card for recording (Step S9).

In the event that there is a region available on the memory card 18 for recording in step S9, the flow proceeds to step S12, and the contents of the program reservation information are automatically executed.

In the event that the recording key does not match in step S8, or in the event that there is no region available on the memory card for recording in step S9, the user uses another memory card (steps S10 and S11) and returns to step S6, where the process of steps S6 through S8 or steps S6 through S9 is repeated.

In the event that determination is made in step S7 that no memory card is mounted, the flow returns to step S6, and enters a standby state awaiting a memory card to be mounted.

In the event that YES has been selected in both steps S2 and S3, image recording to the memory card is given priority.

Next, another example of operations and actions for the image recording reservations according to FIG. 1 will be described with reference to the flowchart in FIG. 4.

In order to mount the memory card 18 and perform program reservation image recording, first, program reservation information such as reception channel, starting time, ending time, etc, need to be input using operating means such as an unshown remote controller. The input program reservation information is set in reservation means 16 (step S21). Note that input of the program reservation information is performed following a menu screen display which is displayed on the display 17, for example. The flow then proceeds to selection of the recording medium. Item selection on the menu screen display is performed by the operating section 19.

First, selection is made regarding whether or not to record to the memory card (step S22). In the event that the reservation image recording determination made in step S22 is NO, the flow proceeds to making settings for reservation image recording to the main recording medium within the recording unit 14. Or, the flow proceeds to program viewing reservation to make reservation for viewing a program with the TV receiver functions (step S25).

In the event that a selection is made to record to the memory card in step S22, selection is made regarding whether or not to make automatic image recording settings (step S23). That is to say, in the event that NO is selected in step S23, the normal recording medium reservation method is set, or in other words, the recording mode never starts unless the timer recording button is pressed (step S26).

In the event that a selection is made in step S23 to set automatic image recording, determination is made regarding whether or not to automatically update (overwrite) the memory card (step S24). "Whether or not to automatically update" is synonymous with selection of whether or not to overwrite. In the event that NO is selected for step S24, normal write-once recording is performed, i.e., image recording is performed at available region other than the region of the recording medium which has already been recorded. In the event that the remaining capacity of the recording medium is insufficient, no more can be recorded, so image recording ends at the point that the available region is gone (step S27). Or, rewriting is performed from the top.

In the event of selecting automatic updating of the card contents in step S24, the memory card is mounted to the device main unit (step S28), following which determination is made regarding whether or not the memory card has been mounted to the mounting section 10-1 of the device main unit (Step S29). In the event that determination is made that the memory card has been mounted, determination is made regarding whether or not the recording key matches (step S30), and in the event that the recording key does not match, the user uses another memory card (step S31) and returns to step S28, where the process of steps S28 through S30 is repeated.

In the event that the recording key matches in step S30, the flow proceeds to step S32, and the contents of the program reservation information and overwrite image recording are automatically executed, and actions for overwriting the memory card 18 from the top is performed at all times regardless of the recorded contents of the memory card 18. The action of overwriting the memory card is a combined actions of erasing in units of block in which erasable recorded information exists and of recording new information to the information erased regions.

In the event that YES has been selected in the steps S22, S23, and S24, image recording to the memory card is given priority, and the greatest feature of the present application can be obtained.

According to the above configuration, in the event that a user desires to record the 7 o'clock news every morning for example, the user sets the memory card 18 in a TV receiver, VCR, DVD recorder, etc., serving as the recording-medium image recording apparatus 10, to which reservation settings have been made the night before, whereby the device main unit automatically enters the image recording reservation mode according to the program reservation information set therein beforehand. The next morning, the user removes the memory card 18 from the recording-medium image recording apparatus 10 when leaving the house, and can mount the memory card 18 to a portable card playback device (viewer) so as to watch the program while away from home. In the event that settings have been made to automatically update the card contents beforehand, as shown in the flowchart in FIG. 4, the memory card is always overwritten from the top regardless of the contents of memory card the day before as long as the updating settings are not changed, so the user is freed from the trouble of constantly preparing new memory cards. Thus, high degree of usability is realized.

Second Embodiment

Figure 5A:
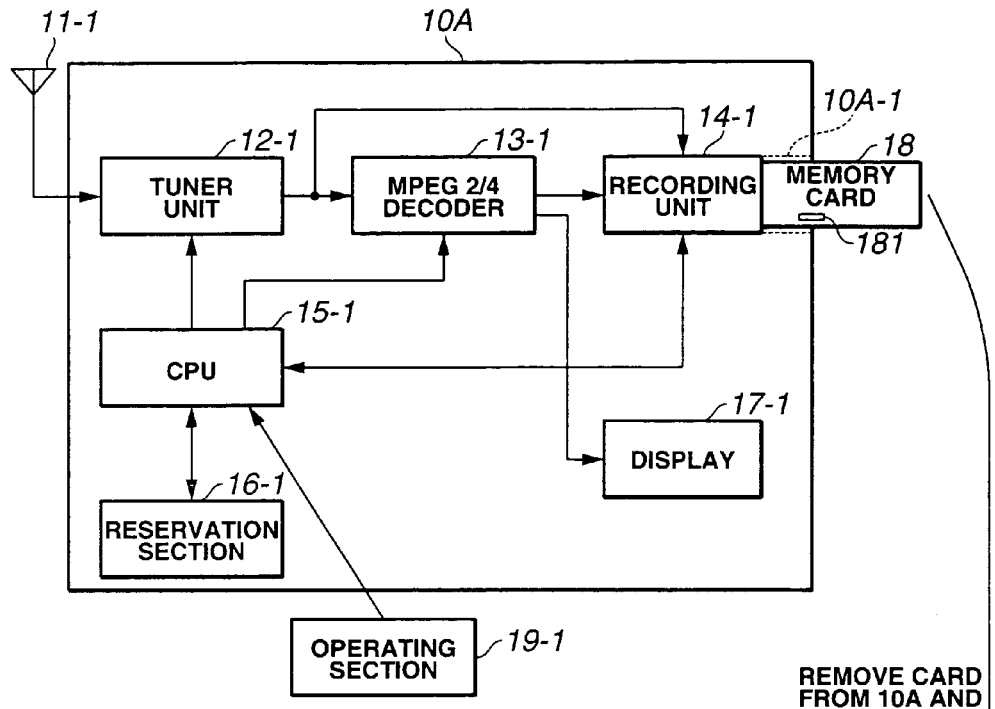
Figure 5B:
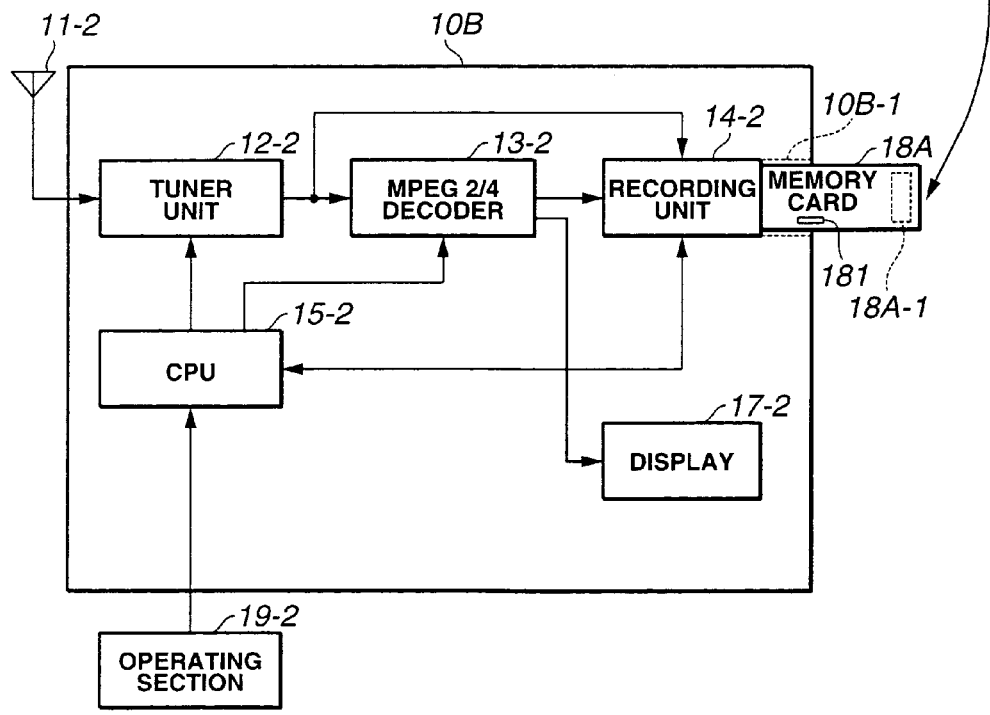

FIGS. 5A and 5B are block diagrams illustrating the schematic configuration of a recording-medium image recording apparatus according to a second embodiment of the present invention. The block layout is the same as that in FIG. 1, but the functions thereof are not the same as those of FIG. 1, and accordingly, different reference numerals from those in FIG. 1 are used. Note however, that the blank memory card 18 in FIG. 5A is denoted by the same reference numeral.

The second embodiment shown in FIGS. 5A and 5B is an arrangement wherein program reservation information is stored in the memory card side at the one image recording device main unit shown in FIG. 5A beforehand, and even in the event that the reservation information has not been set at the other image recording device main unit shown in FIG. 5B, the reservation information is read in upon the memory card containing the program reservation information being mounted thereto, so that the image recording reservation is automatically set to the other device (FIG. 5B).

FIG. 5A illustrates a recording-medium image recording apparatus 10A functioning as a program reservation information recording device, and FIG. 5B illustrates a recording-medium image recording apparatus 10B functioning as a program reservation information executing device.

With the recording-medium image recording apparatus 10A shown in FIG. 5A, reference numeral 11-1 denotes a digital broadcast receiving antenna, 12-1 denotes a tuner unit, 13-1 denotes a MPEG 2/4 decoder, 14-1 denotes a recording unit 15-1 denotes a CPU, 16-1 denotes reservation means, 17-1 denotes a display, 18 denotes a memory card, 19-1 denotes an operating section, and 181 denotes an image recording key serving as an identifier.

With the recording-medium image recording apparatus 10B shown in FIG. 5B, reference numeral 11-2 denotes a digital broadcast receiving antenna, 12-2 denotes a tuner unit, 13-2 denotes a MPEG 2/4 decoder, 14-2 denotes a recording unit 15-2 denotes a CPU, 16-2 denotes reservation means, 17-2 denotes a display, 18A denotes a memory card in which is recorded program reservation information 18A-1, 19-2 denotes an operating section, and 181 denotes an image recording key serving as an identifier. The CPU 15-2 functions to read the program reservation information 18A-1 and image recording key 181 from the memory card 18A via the recording unit 14-2, and set the image recording reservation mode.

In order for the recording-medium image recording apparatus 10A to function as a program reservation information recording device, the program reservation information and information indicating that overwrite image recording is permissible are input and set to the reservation means 16-1 of the device main unit beforehand. Upon mounting the memory card 18 to the mounting section 10A-1 of the device main unit, a display to the effect of "Do you want to record program reservation information and overwrite image recording permission?" is made on the menu screen. Selecting YES with operating section 19-1 such as a remote controller or the like creates a memory card 18A serving as a reservation recording medium recording the program reservation information 18A-1.

In the event that the memory card 18A storing the program reservation information 18A-1 is then removed from the device main unit of the recording-medium image recording apparatus 10A and mounted to the mounting section 10B-1 of another recording-medium image recording apparatus 10B, the recording-medium image recording apparatus 10B functions as a program reservation information executing device, so at the start time, the recording-medium image recording apparatus 10B automatically executes the program reservation information recorded in the memory card 18A, and the picture and voice data of the receiving channel selected with the tuner unit 12-2 is recorded to the memory card 18A.

Figure 6:
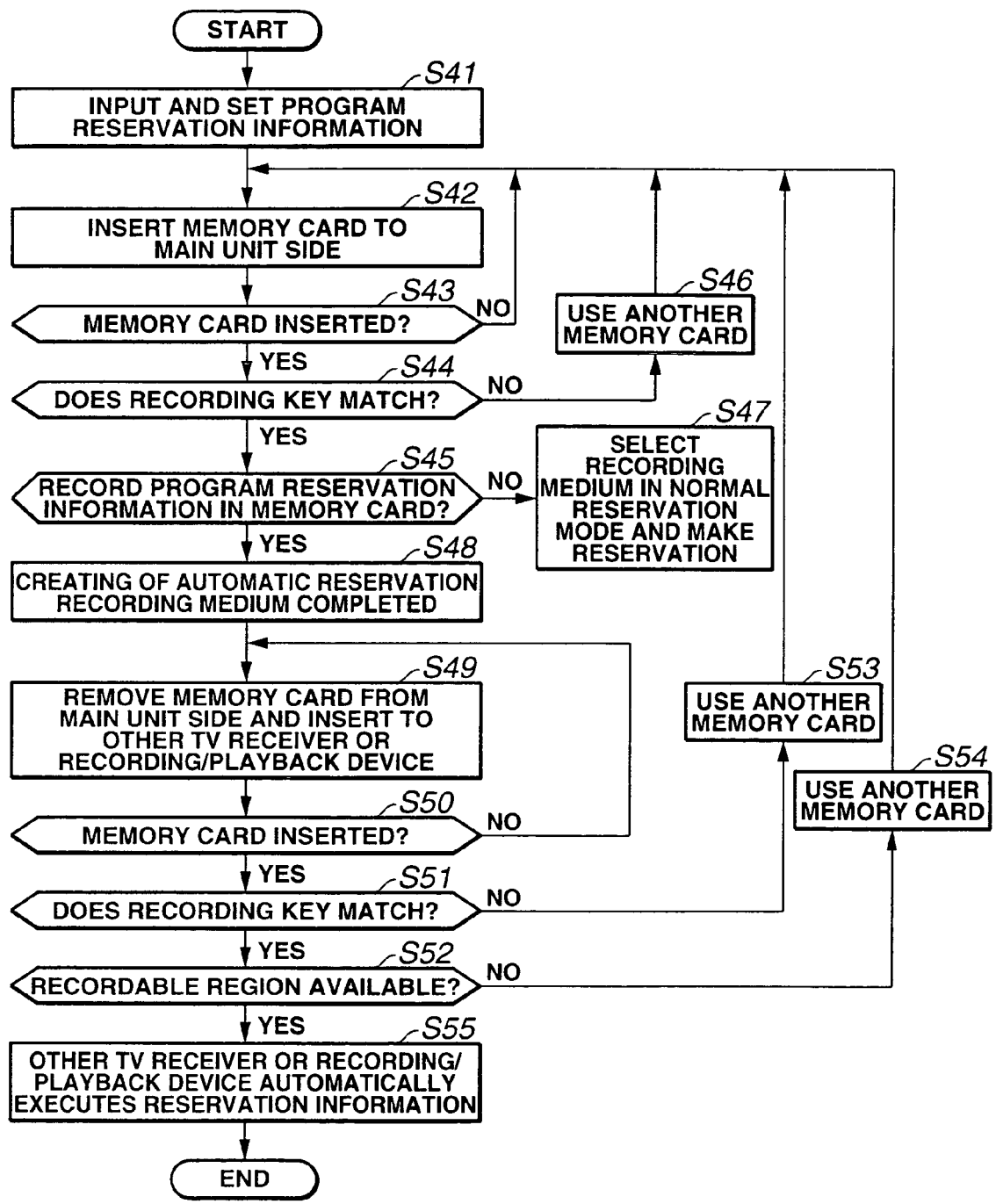
FIG. 6 is a flowchart describing an example of the operations and actions for reservation image recording according to FIGS. 5A and 5B.

FIG. 6 is a flowchart describing an example of the operations and actions of the recording-medium image recording apparatus 10A and 10B in FIGS. 5A and 5B.

First, a user inputs program reservation information in the one recording-medium image recording apparatus 10A. The input information is set in the reservation means 16-1 (step S41). Input of the program reservation information is performed following a menu screen displayed on the display 17-1, for example.

Upon the memory card 18 being mounted to the mounting section 10A-1 of the device main unit (step S42), whether or not a memory card is mounted is determined (step S43), and upon mounting of the memory card being confirmed, whether or not the image recording key of the memory card matches that of the device main unit is determined (step S44). In the event that the image recording key does not match, the user prepares another memory card with a matching image recording key (step S46).

In the event that the image recording key matches in step S44, a display to the effect of "Do you want to record program reservation information in the memory card?" is made on the menu screen (step S45). In the event of selecting NO with the operating section 19-1 such as a remote controller or the like (step S45), settings for writing program reservation information to the memory card 18 are not performed, and reservations are made by selecting the recording medium from the normal reservation mode (step S47).

In the event of selecting YES in step S45, program reservation information 18A-1 is written to the memory card 18, thereby creating a memory card 18A serving as an automatic reservation recording medium storing the program reservation information 18A-1 (step S48).

Next, in the event that the memory card 18A is then removed from the device main unit of the recording-medium image recording apparatus 10A and mounted to another recording-medium image recording apparatus 10B such as a TV receiver or recording/playback device (step S49), the CPU 15-2 determines whether or not the memory card 18A is mounted on the mounting section 10B-1 (step S50), and upon mounting of the memory card being confirmed, whether or not the image recording key 181 of the memory card matches that of the recording-medium image recording apparatus 10B is determined (step S51). In the event that the image recording key matches, determination is made regarding whether or not there is a region available on the memory card 18A for recording (Step S52).

In the event that there is a region available on the memory card 18A for recording in step S52, the flow proceeds to step S55, and the contents of the program reservation information are automatically executed at the recording-medium image recording apparatus 10B.

That is to say, in the event that there is a region available on the memory card 18A for recording in step S52, the flow proceeds to step S55, where the recording-medium image recording apparatus 10B functions as a program reservation information executing device, so at the start time, the recording-medium image recording apparatus 10B automatically executes the program reservation information recorded in the memory card 18A, and the picture and audio data of the receiving channel selected with the tuner unit 12-2 is recorded to the memory card 18A (step S55).

In the event that the recording key does not match in step S51, or in the event that there is no region available on the memory card for recording in step S52, the user uses another memory card (steps S53 or S54) and returns to step S42, where the process of steps S42 through S51 or steps S42 through S52 is repeated.

According to the image recording system shown in FIGS. 5A, 5B, and 6, there is no need to make reservation settings for the image recording reservation executing device shown in FIG. 5B, and program reservation can be automatically executed upon confirmation of the CPU conforming a match of image recording key and available recording region simply by inserting the memory card 18A containing the program reservation information into the recording-medium image recording apparatus 10B functioning as a program reservation information executing device. Accordingly, in the event that there are multiple image recording devices which can function as program reservation information executing devices (e.g., in the event that there are multiple image recording devices and TV receivers manufactured by the same manufacturer for example), inserting the memory card 18A containing the program reservation and overwrite-image-recording-permissible information into any image recording device or TV receiver executes reservations settings, even though the image recording device or TV receiver does not have reservation settings made beforehand, since the memory card 18A contains the program reservation information. This is convenient, since all that is needed to execute reservation settings is the program reservation information contained in the memory card 18A.

Figure 7:
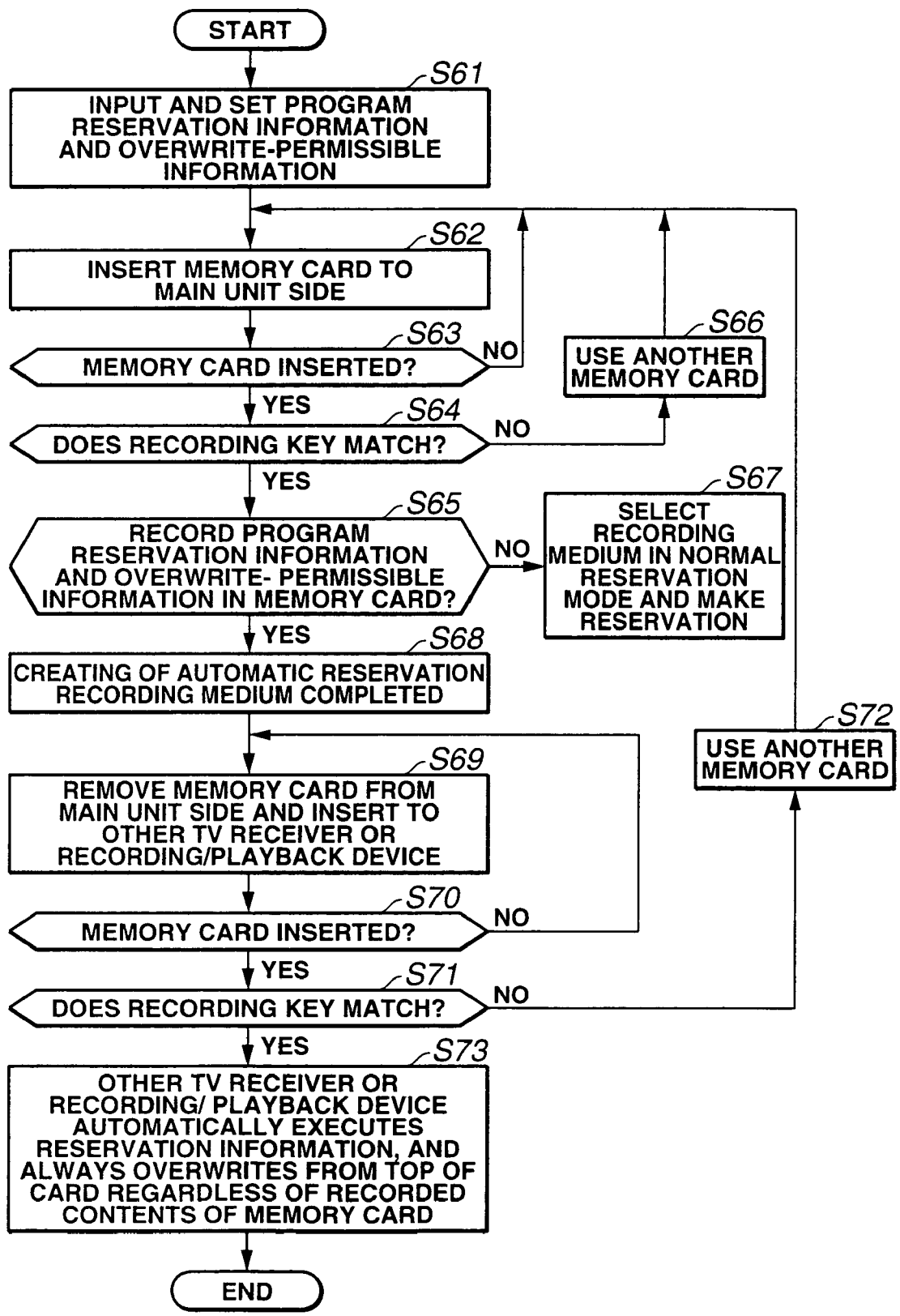
FIG. 7 is a flowchart describing another example of the operations and actions for reservation image recording according to FIGS. 5A and 5B.

FIG. 7 is a flowchart describing another example of the operations and actions of the recording-medium image recording apparatus 10A and 10B in FIGS. 5A and 5B.

First, a user inputs program reservation information and overwrite-image-recording-permissible information in the one recording-medium image recording apparatus 10A. The input information and overwrite-image-recording-permissible information is set in the reservation means 16-1 (step S61). Inputting of the program reservation information and overwrite-image-recording-permissible information is performed following a menu screen displayed on the display 17-1, for example.

Upon the memory card 18 being mounted to the mounting section 10A-1 of the device main unit (step S62), whether or not a memory card is mounted is determined (step S63), and upon mounting of the memory card being confirmed, whether or not the image recording key of the memory card matches that of the device main unit is determined (step S64). In the event that the image recording key does not match, the user prepares another memory card with a matching image recording key (step S66).

In the event that the image recording key matches in step S64, a display to the effect of "Do you want to record program reservation and overwrite-image-recording-permissible information in the memory card?" is made on the menu screen (step S65). In the event of selecting NO with the operating section 19-1 such as a remote controller or the like in step S65, settings for writing program reservation and overwrite-image-recording-permissible information to the memory card 18 are not performed, and reservations are made by selecting the recording medium from the normal reservation mode (step S67).

In the event of selecting YES in step S65, program reservation and overwrite-image-recording-permissible information is written to the memory card 18 as the program reservation information 18A-1, thereby creating a memory card 18A serving as an automatic reservation recording medium storing the program reservation information 18A-1 (step S68).

Next, in the event that the memory card 18A is then removed from the mounting section 10A-1 of the device main unit of the recording-medium image recording apparatus 10A and mounted to another recording-medium image recording apparatus 10B (step S69), the CPU 15-2 determines whether or not the memory card 18A is mounted on the mounting section 10B-1 (step S70), and upon mounting of the memory card 18A being confirmed, whether or not the image recording key 181 of the memory card matches that of the recording-medium image recording apparatus 10B is determined (step S71). In the event that the recording key does not match in step S71, the user uses another memory card (step S72) and returns to step S62, where the process of steps S62 through S71 is repeated.

In the event that the image recording key matches in step S71, the flow automatically proceeds to step S73, where the recording-medium image recording apparatus 10B functions as a program reservation information executing device, so at the start time, the recording-medium image recording apparatus 10B automatically executes the program reservation and overwrite-image-recording-permissible information recorded in the memory card 18A, and the picture and audio data of the receiving channel selected with the tuner unit 12-2 is recorded to the memory card 18A, regardless of the contents of the memory card 18A (step S73).

That is to say, in the event that the image recording key matches in step S71, the flow automatically proceeds to step S73, where the recording-medium image recording apparatus 10B functions as a program reservation information executing device, so at the reserved start time, the recording-medium image recording apparatus 10B automatically executes the program reservation and overwrite-image-recording-permissible information recorded in the memory card 18A, and the picture and audio data of the receiving channel selected with the tuner unit 12-2 is overwritten from the top of the memory card 18A in all cases, regardless of the contents of the memory card 18A (step S73).

According to the image recording system shown in FIGS. 5A, 5B, and 7, there is no need to make reservation settings for the image recording reservation executing device shown in FIG. 5B, and program reservation and overwrite-image-recording-permissible can be automatically executed upon confirmation of the CPU conforming a match of image recording key and available recording region simply by inserting the memory card 18A containing the program reservation and overwrite-image-recording-permissible information into the recording-medium image recording apparatus 10B functioning as a program reservation information executing device. Accordingly, in the event that there are multiple image recording devices which can function as program reservation information executing devices (e.g., in the event that there are multiple image recording devices and TV receivers manufactured by the same manufacturer for example), inserting the memory card 18A containing the program reservation and overwrite-image-recording-permissible information into any image recording device or TV receiver executes reservations settings, even though the image recording device or TV receiver does not have reservation settings made beforehand, since the memory card 18A contains the program reservation and overwrite-image-recording-permissible information. This is convenient, since all that is needed to execute reservation settings is the program reservation and overwrite-image-recording-permissible information contained in the memory card 18A. Overwriting means that even in the event that there is data already recorded in the memory card 18A, this data is overwritten to record newly-reserved picture and audio data.

Third Embodiment

An arrangement may be made wherein a single recording-medium image recording apparatus has two functions: one being a program reservation information recording function wherein, in the event that a blank memory card which is a recording medium with no information written therein is inserted into the device main unit, program reservation information (and overwrite-image-recording-permissible information) set in the device main unit beforehand is written to the memory card; and a program reservation information executing function wherein, in the event that a blank memory card which is a recording medium with no information written therein is inserted into the device main unit, the reservation image recording mode starts, the program reservation information (and overwrite-image-recording-permissible information) set in the device main unit beforehand is executed, so that the received television broadcast signals are recorded in the memory card. Such a recording-medium image recording apparatus can be configured based on the functions of FIG. 5A (the same configuration as with FIG. 1), which is the functions of FIG. 6 or 7, and the functions of FIG. 1, which is the functions of FIG. 3 or 4.

The following two configurations can be given as configuration examples of a recording-medium image recording apparatus having a program reservation information recording function and a program reservation information executing function.

According to a first configuration example, a recording-medium image recording apparatus comprises: a program reservation information recording function comprising a first setting section for setting program reservation information, a first mounting section for mounting a recording medium, a first checking section for checking whether or not a recording medium is mounted to the first mounting section, a first selecting section for selecting whether or not to record the program reservation information in the recording medium, in a state wherein determination has been made by the first checking section that the recording medium is mounted, and a first recording section for recording the program reservation information set by the first setting section in the recording medium, in the event that selection has been made by the first selecting section to record the program reservation information in the recording medium; and a program reservation information execution function comprising a receiving section for receiving television broadcast signals, a demodulating section for demodulating the received television broadcast signals, a second setting section for setting program reservation information, a second selecting section for selecting a recording medium for recording a program, a third setting section whereby automatic image recording is set upon a recording medium being selected by the second selecting section, a second mounting section whereby the recording medium is mounted, a second checking section for checking whether or not the recording medium is mounted to the second mounting section, a third checking section for checking whether or not there is a region in the recording medium capable of recording, in a state wherein determination has been made by the second checking section that the recording medium is mounted, and a second recording section for executing the program reservation information set by the second setting section to record the demodulated broadcast signals in the recording medium, in a state wherein determination has been made by the third checking section that there is a region in the recording medium capable of recording.

Figure 3:
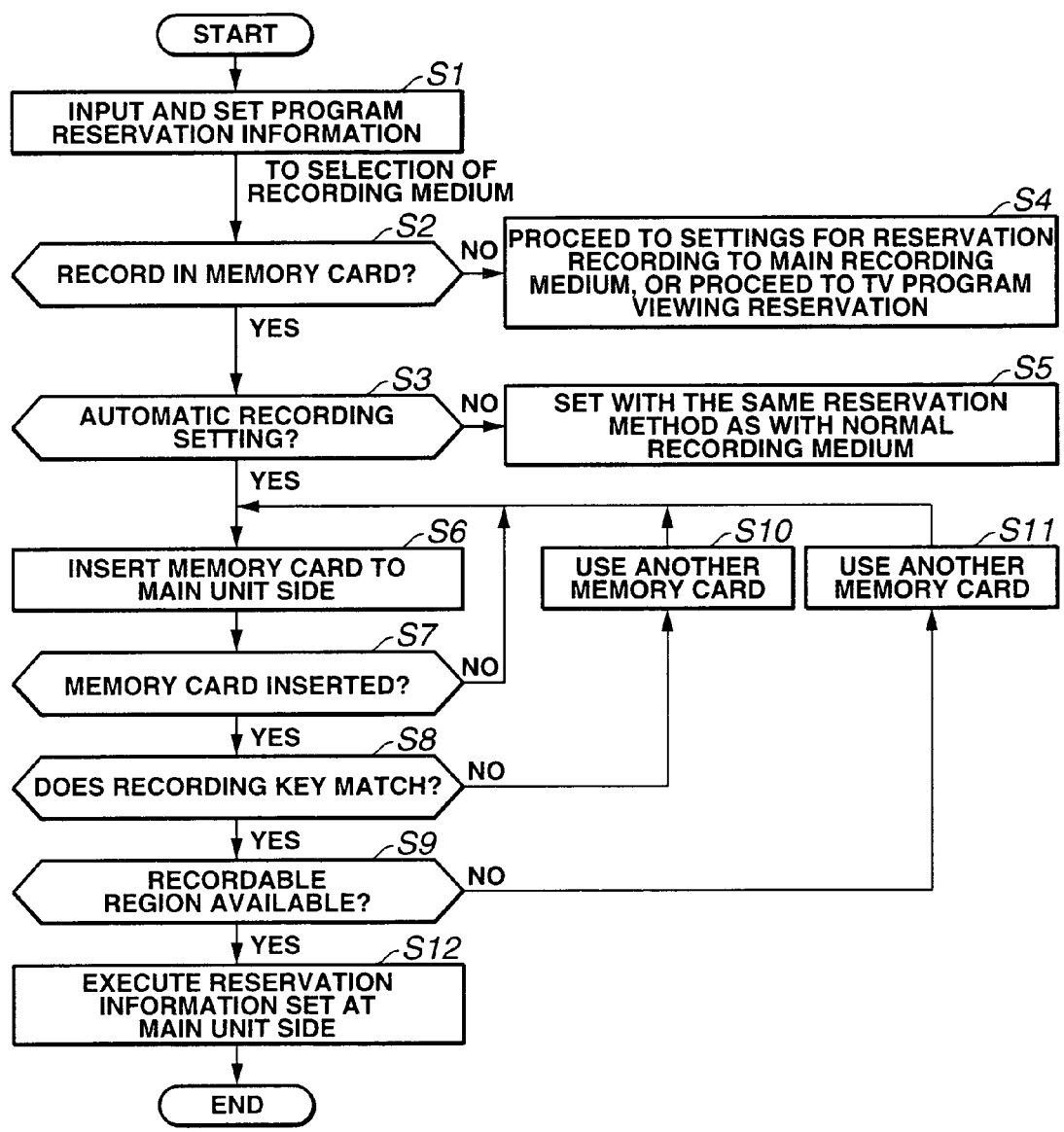
FIG. 3 is a flowchart describing an example of operations and actions of the recording-medium image recording apparatus shown in FIG. 1.

The recording-medium image recording apparatus according to the first configuration example is based on the functions of steps S41 through S48 of the flowchart in FIG. 6 describing the operations and actions of the arrangement shown in of FIGS. 5A (and 5B), and the functions of the steps S1 through S12 of the flowchart in FIG. 3 describing the operations and actions of the arrangement shown in FIG. 1. That is to say, with the recording-medium image recording apparatus according to the first configuration example, a single recording-medium image recording apparatus has the two functions of a program reservation information recording function wherein, in the event of a recording medium with no information written thereto being inserted into the device main unit, program reservation information set in the device main unit beforehand is written to the recording medium, and of a program reservation information executing function wherein, in the event of a recording medium with no information written thereto being inserted into the device main unit, the reservation image recording mode starts, and the program reservation information set in the device main unit beforehand is executed, so that the received television broadcast signals are recorded in the recording medium.

According to a second configuration example, a recording-medium image recording apparatus comprises: a program reservation information recording function comprising a first setting section for setting program reservation and overwrite-image-recording-permissible information, a first mounting section for mounting a recording medium, a first checking section for checking whether or not a recording medium is mounted to the mounting section, a first selecting section for selecting whether or not to record the program reservation and overwrite-image-recording-permissible information in the recording medium, in a state wherein determination has been made by the first checking section that the recording medium is mounted, and a first recording section for recording the program reservation and overwrite-image-recording-permissible information set by the first setting section in the recording medium, in the event that selection has been made by the first selecting section to record the program reservation and overwrite-image-recording-permissible information in the recording medium; and a program reservation information execution function comprising a receiving section for receiving television broadcast signals, a demodulating section for demodulating the received television broadcast signals, a second setting section for setting program reservation information, a second selecting section for selecting a recording medium for recording a program, a third setting section whereby automatic image recording is set upon a recording medium being selected by the second selecting section, a fourth setting section for setting automatic updating of the recording medium, in the state that automatic image recording to a recording medium has been set by the third setting section, a second mounting section whereby the recording medium is mounted, a second checking section for checking whether or not the recording medium is mounted to the second mounting section, and a second recording section for executing the program reservation information set by the second setting section to record the demodulated broadcast signals by overwriting from the top in the recording medium regardless of the contents of the recording medium, in a state wherein determination has been made by the second checking section that the recording medium is mounted.

Figure 4:
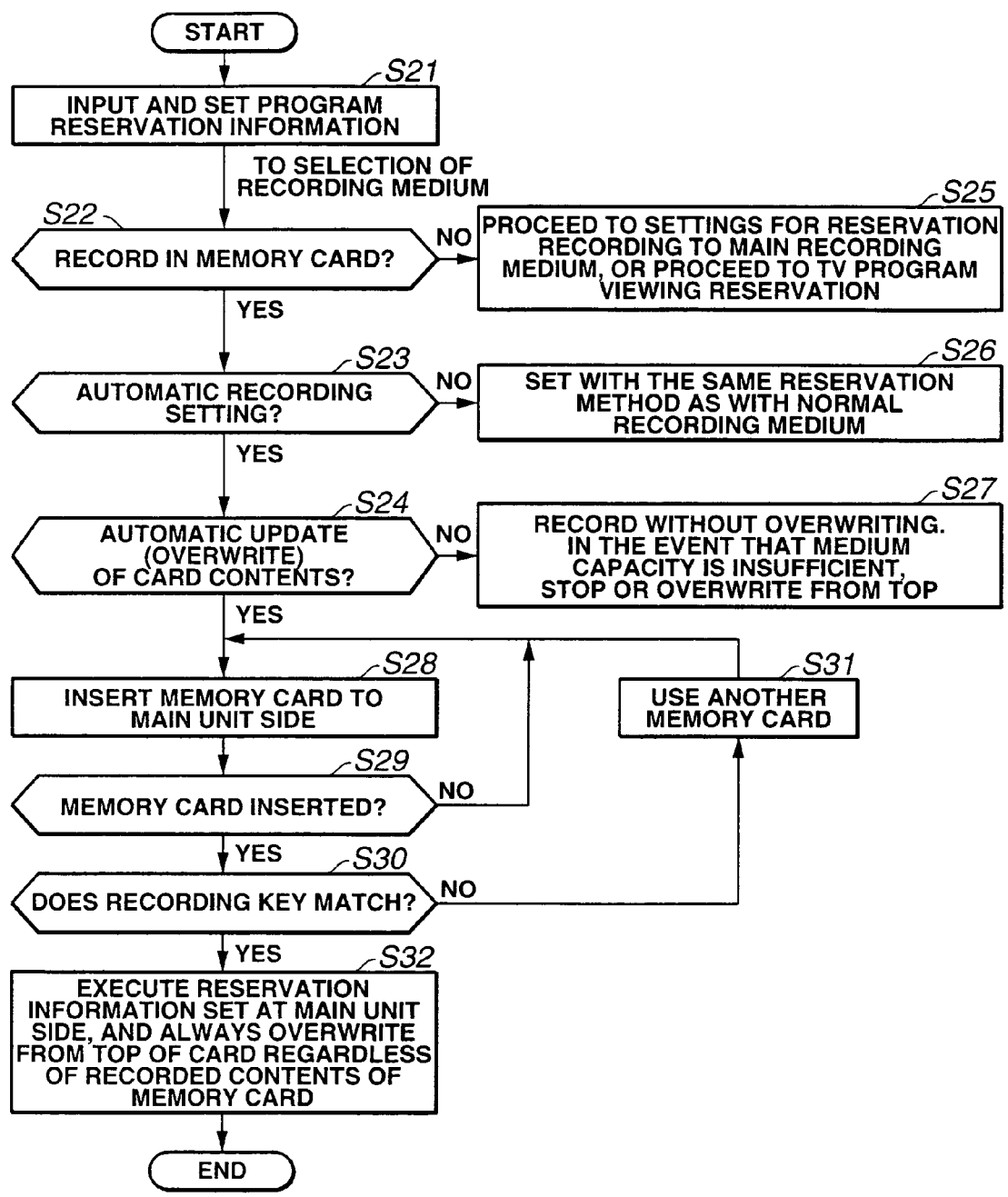
FIG. 4 is a flowchart describing another example of operations and actions of the recording-medium image recording apparatus shown in FIG. 1.

The recording-medium image recording apparatus according to the second configuration example is based on the functions of steps S61 through S68 of the flowchart in FIG. 7 describing the operations and actions of the arrangement shown in of FIGS. 5A (and 5B), and the functions of the steps S21 through S32 of the flowchart in FIG. 4 describing the operations and actions of the arrangement shown in FIG. 1. That is to say, with the recording-medium image recording apparatus according to the second configuration example, a single recording-medium image recording apparatus has the two functions of a program reservation information recording function wherein, in the event of a recording medium with no information written thereto being inserted into the device main unit, program reservation and overwrite-image-recording-permissible information set in the device main unit beforehand is written to the recording medium, and of a program reservation information executing function wherein, in the event of a recording medium with no information written thereto being inserted into the device main unit, the reservation image recording mode starts, and the program reservation and overwrite-image-recording-permissible information set in the device main unit beforehand is executed, so that the received television broadcast signals are overwritten on the recording medium.

The present invention is particularly advantageous in that TV receivers having recording functions or recording/playback devices can be made to operate giving priority to image recording at the time of making program recording reservations for examples, simply by inserting a detachable recording medium.

Having described the preferred embodiments of the invention referring to the accompanying drawings, it should be understood that the present invention is not limited to those precise embodiments and various changes and modifications thereof could be made by one skilled in the art without departing from the spirit of scope of the invention as defined in the appended claims.

What is claimed is:

1. A recording system which records images into a recording medium, comprising:
   a recording device configured to record program reservation information, the recording device including:
      a setting section configured to set program reservation and overwrite-image-recording-permissible information,
      a first mounting section for mounting the recording medium into the recording device,
      a first recording section configured to record the program reservation and overwrite-image-recording-permissible information set by the setting section in the recording medium; and
   an execution device configured to execute program reservation information, the execution device including:
      a receiving section configured to receive television broadcast signals,
      a demodulating section configured to demodulate the received television broadcast signals,
      a second mounting section for mounting the recording medium into the execution device, and
      a second recording section configured to execute the program reservation and overwrite-image-recording-permissible information recorded in the recording medium to record the demodulated broadcast signals by overwriting from the top in the recording medium regardless of the contents of the recording medium, in a state wherein the recording medium has been mounted to the second mounting section.

2. The recording system according to claim 1, further comprising:
   a first checking section for checking whether a recording medium is mounted to the first mounting section, and
   a second checking section for checking whether the recording medium is mounted to the second mounting section,
   wherein said second recording section executes the program reservation and overwrite-image-recording-permissible information recorded in the recording medium to record the demodulated broadcast signals by overwriting from the top in the recording medium regardless of the contents of the recording medium, in a state wherein determination has been made by the second checking section that the recording medium is mounted to the second mounting section.

3. The recording system according to claim 1, further comprising:
   a recording key set in the recording medium corresponding to the origin or classification of said program reservation information recording device and said program reservation information execution device; and
   a determining section for determining, at the time of the recording medium being mounted to the first and second mounting sections, whether the recording key matches, and permitting the image recording only in the event of matching.

4. The recording system according to claim 2, further comprising:

a recording, key set in the recording medium corresponding to the origin or classification of said program reservation information recording device and said program reservation information execution device; and a determining section for determining, at the time of the recording medium being mounted to the first and second mounting sections, whether the recording key matches, and permitting the image recording only in the event of matching.

5. A recording-medium image recording method comprising:

a program reservation information recording procedure comprising a setting step for setting program reservation and overwrite-image-recording-permissible information, a first mounting step for mounting a recording medium to a first mounting section, a selecting step for selecting whether to record the program reservation and overwrite-image-recording-permissible information in the recording medium, in a state wherein the recording medium has been mounted to the first mounting section in the first mounting step, a first recording step for recording the program reservation and overwrite-image-recording-permissible information set by the setting step in the recording medium, in the event that recording to the recording medium has been selected in the selecting step; and a program reservation information execution procedure comprising a receiving step for receiving television broadcast signals, a demodulating step for demodulating received television broadcast signals, a second mounting step whereby the recording medium is mounted to a second mounting section, and a second recording step for executing the program reservation and overwrite-image-recording-permissible information recorded in the recording medium to record the demodulated broadcast signals by overwriting from the top in the recording medium regardless of the contents of the recording medium, in a state wherein the recording medium has been mounted to the second mounting section in the second mounting step.

6. A recording-medium image recording method according to claim 5, further comprising:

a first checking step for checking whether a recording medium is mounted to the first mounting section, and a second checking step for checking whether the recording medium is mounted to the second mounting section, wherein said selecting step selects whether to record the program reservation and overwrite-image-recording-permissible information in the recording medium, in a state wherein determination has been made by the first checking step that the recording medium is mounted to the first mounting section, and said second recording step executes the program reservation and overwrite-image-recording-permissible information recorded in the recording medium to record the demodulated broadcast signals by overwriting from the top in the recording medium regardless of the contents of the recording medium, in a state wherein determination has been made by the second checking step that the recording medium is mounted to the second mounting section.

7. A recording-medium image recording method according to claim 5, further comprising:

a determining step for determining, at the time of the recording medium being mounted to the first and second mounting sections, whether a recording key matches, and permitting the image recording only in the event of matching, wherein the recording key had been set in the recording medium corresponding to the origin or classification of the device main unit.

8. A recording-medium image recording method according to claim 6, further comprising:

a determining step for determining, at the time of the recording medium being mounted to the first and second mounting sections, whether a recording key matches, and permitting the image recording only in the event of matching, wherein the recording key had been set in the recording medium corresponding to the origin or classification of the device main unit.

\* \* \* \* \*